United States Patent
Sugawara et al.

(10) Patent No.: US 8,931,605 B2
(45) Date of Patent: Jan. 13, 2015

(54) FLUID PRESSURE DAMPER

(75) Inventors: Hidetoshi Sugawara, Kani (JP);
Takahiko Jinnouchi, Minokamo (JP);
Takeshi Tomiuga, Minokamo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 23 days.

(21) Appl. No.: 13/695,494

(22) PCT Filed: Nov. 18, 2011

(86) PCT No.: PCT/JP2011/076720
§ 371 (c)(1),
(2), (4) Date: Oct. 31, 2012

(87) PCT Pub. No.: WO2012/070506
PCT Pub. Date: May 31, 2012

(65) Prior Publication Data
US 2013/0049274 A1 Feb. 28, 2013

(30) Foreign Application Priority Data

Nov. 24, 2010 (JP) ................................ 2010-260825

(51) Int. Cl.
*F16F 9/00* (2006.01)
*F16F 9/32* (2006.01)
*F16F 13/00* (2006.01)

(52) U.S. Cl.
CPC ............ *F16F 9/3242* (2013.01); *F16F 13/007* (2013.01)
USPC ........................ 188/322.19; 188/397; 188/315

(58) Field of Classification Search
USPC .................. 188/266, 269, 297, 315; 267/217; 280/275, 276
See application file for complete search history.

(56) References Cited

U.S. PATENT DOCUMENTS

| | | | | |
|---|---|---|---|---|
| 4,057,264 A * | 11/1977 | Suzuki et al. | ................. | 280/276 |
| 6,918,605 B2 * | 7/2005 | Wada et al. | ................... | 280/279 |
| 8,256,588 B2 * | 9/2012 | Mori | ............................. | 188/298 |
| 8,459,419 B2 * | 6/2013 | Jinnouchi | ................ | 188/322.19 |
| 8,499,905 B2 * | 8/2013 | Uchiyama et al. | ............ | 188/276 |
| 2005/0145456 A1 * | 7/2005 | Tomonaga et al. | ........... | 188/297 |
| 2008/0053764 A1 * | 3/2008 | Tomonaga et al. | ........... | 188/315 |

FOREIGN PATENT DOCUMENTS

| | | |
|---|---|---|
| JP | 63-199894 U | 12/1988 |
| JP | 2003-247584 A | 9/2003 |
| JP | 2003307246 A * | 10/2003 |
| JP | 2006-329371 A | 12/2006 |
| JP | 2008-069830 A | 3/2008 |
| JP | 2009-222221 A | 10/2009 |
| JP | 2010-112547 A | 5/2010 |

* cited by examiner

*Primary Examiner* — Thomas J Williams
*Assistant Examiner* — Mariano Sy
(74) *Attorney, Agent, or Firm* — Rabin & Berdo, P.C.

(57) ABSTRACT

A fluid pressure damper is provided with a damper main body composed of an outer tube and an inner tube, a bottom member for sealing a bottom side opening of the damper main body, a suspension spring and a damper. The damper includes a cylinder storing a working fluid inside. The cylinder is inserted into the inner tube and fixed to the bottom member by being sandwiched between a head member fixed to a joint member coupled to the inner tube and the bottom member. The joint member includes a stopper member with the inner periphery of which the head member is threadably engaged, and a pin member which couples the stopper member to the inner periphery of the inner tube. The suspension spring is supported by the stopper member.

3 Claims, 3 Drawing Sheets

FLUID PRESSURE DAMPER

TECHNICAL FIELD

The present invention relates to a fluid pressure damper.

BACKGROUND ART

A fluid pressure damper is utilized as a suspension system such as a front fork or a rear cushion unit for damping road surface vibration input to a wheel of a two-wheel vehicle while suspending the wheel.

JP2008-69830A discloses the configuration of a conventional front fork. This front fork includes a fork main body composed of an outer tube and an inner tube slidably inserted in the outer tube, and is set to be of an inverted type.

The fork main body includes a cap member and a bottom member for sealing upper and lower openings. A suspension spring for absorbing road surface vibration and an upright damper for damping extension and contraction movements of the fork main body associated with the absorption of road surface vibration are housed in the fork main body. A reservoir chamber for storing a working fluid is formed between the fork main body and this damper.

The damper includes a cylinder which stands in an axial center part of the inner tube and stores the working fluid, a rod which is fixed to the outer tube and projects into and retracts from the cylinder, and a piston which is held on the leading end of this rod and partitions the interior of the cylinder into two working chambers.

A head member and a base member are respectively threadably fitted on a head part and a bottom part of the cylinder.

The bottom member for sealing the lower opening of the fork main body is formed to be tubular. The bottom member includes an opening side large opening forming a cylindrical space having a large diameter at the fork main body side and a back side small opening forming a cylindrical space having a small diameter and extending coaxially with the former cylindrical space.

In the damper, a bottom part of the inner tube is threadably engaged with the inner periphery of the opening side large opening, the base member is inserted into the back side small opening and a clearance between the outer periphery of the base member and the inner periphery of the back side small opening is sealed by a seal member.

In the damper, the cylinder can be fixed in the axis center part of the inner tube by threadably engaging the bottom part of the cylinder with the base member.

SUMMARY OF THE INVENTION

In the front fork, the openings at the head side and the bottom side of the cylinder need to be threaded. For threading, the openings of the cylinder need to be thickened to prevent a reduction in mechanical strength caused by threading. This prevents weight saving of the front fork and requires time and effort for machining.

Accordingly, the following front fork is thought to eliminate the need for threading of the cylinder and improve weight saving and workability.

As shown in FIG. 3, a front fork has the same basic configuration as the conventional front fork. A bottom member 20 is in the form of a bottomed tube and includes an opening side large opening 20a, a back side small opening 20b and a step portion 20c.

A bottom part (lower side in FIG. 3) of an inner tube 2 is threadably engaged with the inner periphery of the opening side large opening 20a. A bottom part (lower side in FIG. 3) of a cylinder 31 is inserted into the back side large opening 20b. A head member 30 is threadably engaged with a joint member J coupled to the inner tube 2 and the cylinder 31 is sandwiched between the head member 30 and the bottom member 20.

In this way, the cylinder 31 and the inner tube 2 can be fixed to the bottom member 20 in the front fork.

By configuring the front fork as described above, the cylinder 31 can be fixed to the bottom member 20 without threading the cylinder 31. Thus, the front fork can be made lighter and the workability thereof can be improved by eliminating the need for the threading of the cylinder.

As shown in FIG. 3, since this front fork is such that a spring seat 400 is fitted to the head member 30 and a suspension spring S for absorbing road surface vibration is supported by the head member 30, there is a possibility that a rotation torque acts on the head member 30 and the head member 30 becomes loose as the suspension spring S extends and contracts.

This may possibly cause the cylinder 31 to shake and hinder a smooth movement of the piston 33 sliding in the cylinder 31.

This invention aims to provide a fluid pressure damper capable of preventing a head member tightly holding a cylinder from becoming loose.

According to one aspect of the present invention, a fluid pressure damper is provided which comprises a damper main body which includes an outer tube and an inner tube slidably inserted into the outer tube; a bottom member which seals a bottom side opening of the damper main body; a suspension spring which is housed in the damper main body and absorbs an impact applied to the damper main body; and a damper which is housed in the damper main body and damps extension and contraction movements of the damper main body associated with the absorption of an impact by the suspension spring; wherein the damper includes a cylinder standing in an axial center part of the inner tube and storing a working fluid inside the cylinder is inserted into the inner tube and fixed to the bottom member by being sandwiched between a head member fixed to a joint member coupled to the inner tube and the bottom member; the joint member includes a stopper member which is in the form of a ring and with an inner periphery of which the head member is threadably engaged, and a pin member which couples the stopper member to an inner periphery of the inner tube; and the suspension spring is supported by the stopper member.

Embodiments of the present invention and advantages thereof are described in detail below with reference to the accompanying drawings.

DESCRIPTION OF EMBODIMENTS

In the following description, same reference signs assigned through several drawings denote the same or corresponding components.

A fluid pressure damper according to this embodiment functions as a front fork which suspends a front wheel of a motorcycle and damps road surface vibration input to the front wheel due to the unevenness of a road surface.

The front fork is composed of a pair of left and right fork members whose upper end parts are coupled by a bridge mechanism and is suspended to sandwich the front wheel by coupling a lower end part of each fork member to an axle of the front wheel.

The bridge mechanism includes a steering shaft coupled to a handle and enables the steering of the front wheel by a handle operation.

Figure 1:
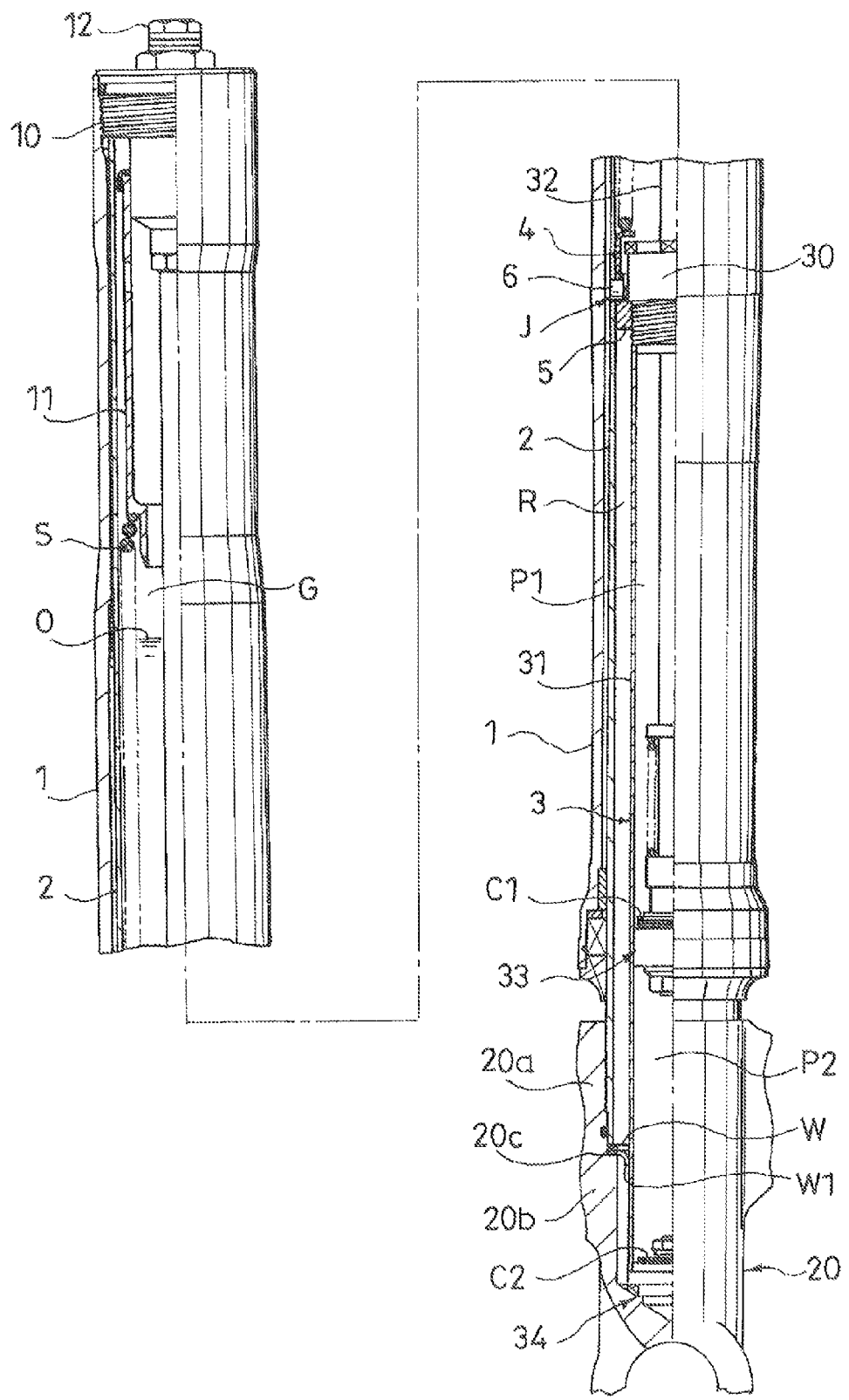
FIG. 1 is a half sectional view showing a fluid pressure damper according to an embodiment of the present invention.

As shown in FIG. 1, the fork member includes a fork main body composed of an outer tube 1 and an inner tube 2 slidably inserted into this outer tube 1.

The fork member includes a bottom member 20, a suspension spring S and a damper 3. The bottom member 20 includes a cylindrical space with an opening on a fork main body side and seals a bottom side opening (lower side in FIG. 1) of the fork main body. The suspension spring S is housed in the fork main body to absorb an impact, i.e. road surface vibration applied to the fork main body. The damper 3 is housed in the fork main body to damp extension and contraction movements of the fork main body associated with the absorption of the road surface vibration.

The damper 3 includes a cylinder 31 standing in an axial center part of the inner tube 2 and storing a working fluid inside.

A bottom part (lower part in FIG. 1) of the inner tube 2 is coupled to the inner periphery of the bottom member 20 and the cylinder 31 is inserted into the inner tube 2. The cylinder 31 is fixed to the bottom member 20 by sandwiching the cylinder 31 between a head member 30 fixed to a joint member J coupled to the inner tube 2 and the bottom member 20.

The joint member J includes a stopper member 5 which is in the form of a ring and with the inner periphery of which the head member 30 is threadably engaged, and a pin member 6 which couples the stopper member 5 to the inner periphery of the inner tube 2. The fork member supports a lower end side of the suspension spring S in FIG. 1 by the stopper member 5.

Each component of the front fork is described in detail below.

The fork main body composed of the outer tube 1 and the inner tube 2 is an inverted front fork in which the outer tube 1 is arranged on a vehicle body side and the inner tube 2 is arranged on a wheel side.

The fork main body has the upper and lower ends thereof respectively sealed by a cap member 10 and the bottom member 20 and houses the suspension spring S for absorbing road surface vibration and the damper 3 for generating a predetermined damping force inside.

In this way, the front fork can damp extension and contraction movements of the fork main body associated with the absorption of the road surface vibration by the suspension spring S using the damper 3 and can improve ride quality of the motorcycle.

A reservoir chamber R is formed between the fork main body and the damper 3. The working fluid is stored in the reservoir chamber R and a gas chamber G in which a gas is enclosed is formed above a fluid level O of the working fluid.

The fluid level O is so set that the head member 30 in contact with the upper end of the cylinder 31 in FIG. 1 is immersed in the working fluid stored in the reservoir chamber R even when the fork main body maximally extends to lower the fluid level O most.

The gas chamber G expands and shrinks as the fork main body extends and contracts to generate a predetermined spring reaction force and functions as an air spring.

An inner pressure of the gas chamber G can be adjusted to increase and decrease by an air valve provided in the cap member 10.

The damper 3 housed in the fork main body includes the cylinder 31, a rod 32 and a damping force generation mechanism. The cylinder 31 stands in the axial center part of the inner tube 2 and stores the working fluid. The rod 32 is fixed to the outer tube 1 via the cap member 10 and projects into and retracts from the cylinder 31. The damping force generation mechanism generates a predetermined damping force as this rod 32 projects and retracts.

The cylinder 31 is sandwiched between the head member 30 threadably engaged with the joint member J fixed to the inner tube 2 and held in contact with the upper end of the cylinder 31 in FIG. 1 and the bottom member 20 held in contact with the lower end of the cylinder 31 in FIG. 1 via a base member 34.

The cylinder 31 forms two working chambers partitioned by a piston 33 in the interior of the cylinder 31 formed between the head member 30 and the base member 34. The working chambers are composed of an extension side working chamber P1 located on a rod side and a compression side working chamber P2 located on a piston side.

The head member 30 is in the form of a ring and includes an annular bush on the inner periphery. The head member 30 slides in contact with the outer periphery of the rod 32 via the annular bush and assists smooth movements of the rod 32 into and out of the cylinder 31.

The joint member J includes the annular stopper member 5 with the inner periphery of which the head member 30 is threadably engaged, and the pin member 6 which couples the stopper member 5 to the inner periphery of the inner tube 2.

Figure 2:
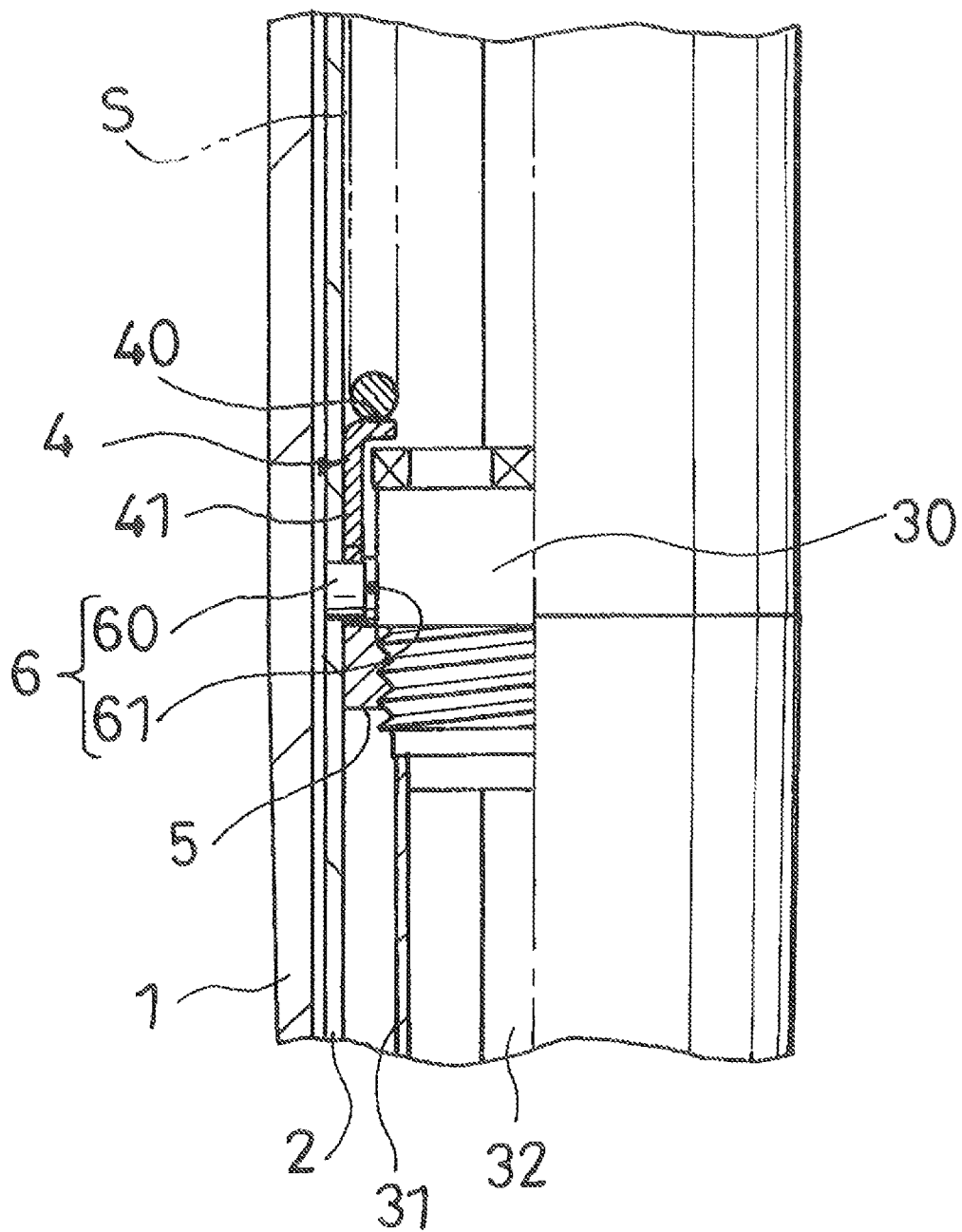
FIG. 2 is an enlarged half sectional view showing a part around a head member in the fluid pressure damper according to the embodiment of the present invention.
Figure 3:
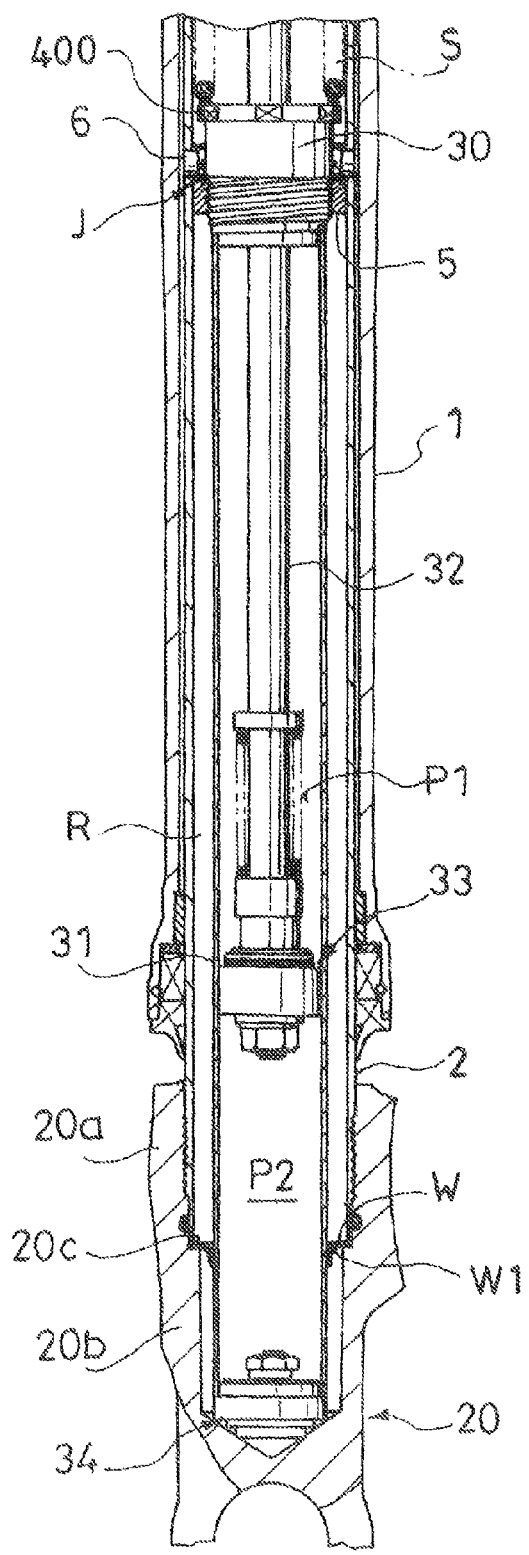
FIG. 3 is a vertical sectional view partially showing an example of a front fork.

As shown in FIG. 2, the pin member 6 is composed of a pin 60 which penetrates through an insertion hole perforated in the stopper member 5 and an insertion hole perforated in the inner tube 2, and a snap ring 61 which biases the pin 60 toward an outer peripheral side.

By causing the both insertion holes to face each other and inserting the pin 60 from the stopper member 5 side, the stopper member 5 can be fixed in conformity with the position of the insertion hole of the inner tube 2 by the pin member 6.

The damping force generation mechanism in the damper 3 for generating a predetermined damping force is composed of extension side leaf valves for generating a predetermined damping force when the fork main body extends and compression side leaf valves for generating a predetermined damping force when the fork main body contracts.

The extension side leaf valve is mounted on the piston 33 held on the leading end of the rod 32 and the compression side leaf valve is mounted on the base member 34 fixed to the bottom end (lower end in FIG. 1) of the cylinder 31.

The piston 33 is formed with an extension side flow path and a compression side flow path which allow communication between the two working chambers P1, P2. The extension side leaf valve is mounted in the extension side flow path to be openable and closable at the compression side working chamber P2 side that is an exit side. A compression side check valve C1 which permits only a movement of the working fluid from the compression side working chamber P2 to the extension side working chamber P1 is mounted in the compression side flow path to be openable and closable at the extension side working chamber P1 side that is an exit side.

The base member 34 is formed with an extension side flow path and a compression side flow path which allow communication between the compression side working chamber P2 and the reservoir chamber R. The compression side leaf valve is mounted in the compression side flow path to be openable and closable at the reservoir chamber R side that is an exit side. An extension side check valve C2 which permits only a movement of the working fluid from the reservoir chamber R to the compression side working chamber P2 is mounted in the extension side flow path to be openable and closable at the compression side working chamber P2 side that is an exit side.

Since the working fluid produces resistance in moving while pushing each leaf valve open, the front fork functions as a fluid pressure damper by damping extension and contraction movements of the fork main body.

When the fork main body extends or contracts, an amount of the working fluid that becomes insufficient or excessive in the cylinder 31 by as much as the rod 32 projects or retracts can be compensated by the reservoir chamber R via the base member 34.

The configuration of the damping force generation mechanism is not limited to the above and an appropriate known configuration can be adopted.

The cylinder 31 forming the damper 3 and the inner tube 2 forming the fork main body are fixed to the bottom member 20 for sealing the lower opening of the fork main body in FIG. 1.

The bottom member 20 is in the form of a bottomed tube and includes an opening side large opening 20a, a back side small opening 20b having a small diameter and a step portion 20c. The opening side large opening 20a has a cylindrical space having a large diameter and opening toward the fork main body and is threadably engaged with the outer periphery of the inner tube 2. The back side small opening 20b forms a cylindrical space having a small diameter and located at the back side of the above cylindrical space and on the same axis as the above cylindrical space, and the cylinder 31 of the damper 3 is inserted thereinto. The step portion 20c is formed between the opening side large opening 20a and the back side small opening 20b.

The cylinder 31, in a state inserted in the inner tube 2, is inserted into the back side small opening 20b of the bottom member 20 and fixed to the bottom member 20 by threadably engaging the head member 30 with the stopper member 5.

A washer W and a guide washer W1 are sandwiched between the step portion 20c of the bottom member 20 and the lower end of the inner tube 2 in FIG. 1.

The washer W is in the form of a ring and receives a surface pressure of the inner tube 2. The guide washer W1 is composed of an annular washer portion sandwiched between the step portion 20c and the inner tube 2 and a guide portion extending from the inner periphery of this washer portion while being curved downwardly in FIG. 1.

By including the guide washer W1, the cylinder 31 can be inserted into the back side small opening 20b of the bottom member 20 while being guided by the guide portion and vibration of the cylinder 31 can be prevented.

Since the guide portion of the guide washer W1 is formed with a cutout, a movement of the working fluid stored in the reservoir chamber R is not hindered by the guide washer W1.

The suspension spring S for absorbing the road surface vibration is a coil spring interposed between a tubular spring bearing case 11 mounted on the cap member 10 and a spring seat 4 arranged on the stopper member 5 and biases the fork main body in an extension direction.

The spring bearing case 11 moves upward and downward according to the rotation of an adjuster 12 provided in an axial center part of the cap member 10 and adjusts to increase and decrease the spring force of the suspension spring S.

The spring seat 4 is loosely fitted in the inner tube 2 and supported on the stopper member 5. As shown in FIG. 2, the spring seat 4 is composed of an annular seat portion 40 for receiving the suspension spring S and a leg portion 41 hanging down from the seat portion 40 and held in contact with the stopper member 5.

Since the suspension spring S is supported on the stopper member 5 and not directly supported on the head member 30, a rotation torque associated with extension and contraction of the suspension spring S does not act on the head member 30, which can prevent the head member 30 from becoming loose.

Therefore, it is possible to prevent the head member 30 becoming loose and the cylinder 31 shaking to hinder a smooth movement of the piston 33 sliding in the cylinder 31.

The suspension spring S is loosely fitted in the inner tube 2 and supported via the spring seat 4 configured as described above, whereby the stopper member 5 is not abraded and a degree of flexibility in the design of the stopper member 5 is improved.

That is, in the case of directly supporting the suspension spring S by the stopper member 5, an installation surface for receiving the suspension spring S has to be secured on the stopper member 5 and the stopper member 5 needs to be formed thick. However, by including the spring seat 4 configured as described above, a degree of flexibility in design can be improved without thickening the stopper member 5.

The embodiments of the present invention described above are merely illustration of some application examples of the present invention and not of the nature to limit the technical scope of the present invention to the specific constructions of the above embodiments.

For example, although an example in which the present invention is applied to the front fork has been described in the above embodiment, the present invention may be applied to a rear cushion unit or the like without being limited to this.

The present application claims a priority based on Japanese Patent Application No. 2010-260825 filed with the Japan Patent Office on Nov. 24, 2010, all the contents of which are hereby incorporated by reference.

The invention claimed is:

1. A fluid pressure damper, comprising:
    a damper main body which includes an outer tube and an inner tube slidably inserted into the outer tube;
    a bottom member which seals a bottom side opening of the damper main body;
    a suspension spring which is housed in the damper main body and absorbs an impact applied to the damper main body; and
    a damper which is housed in the damper main body and damps extension and contraction movements of the damper main body associated with the absorption of an impact by the suspension spring;
    wherein the damper includes a cylinder standing in an axial center part of the inner tube and storing a working fluid inside;
    the cylinder is inserted into the inner tube and fixed to the bottom member by being sandwiched between a head member fixed to a joint member coupled to the inner tube and the bottom member;
    the joint member includes a stopper member which is in the form of a ring and with an inner periphery of which the head member is threadably engaged, and a pin member which couples the stopper member to an inner periphery of the inner tube;

the suspension spring is supported by the stopper member via a spring seat;

the suspension spring is in direct contact with the spring seat; and the spring seat is in direct contact with the stopper member.

2. The fluid pressure damper according to claim 1, wherein:

the spring seat includes an annular seat portion which receives the suspension spring and a leg portion which hangs down from the seat portion and is held in contact with the stopper member.

3. The fluid pressure damper according to claim 1, wherein the spring seat is free of any direct contact with the head member.

* * * * *